United States Patent
Zlotnick et al.

(10) Patent No.: US 11,967,068 B2
(45) Date of Patent: Apr. 23, 2024

(54) PRE-NMS FILTERING USING A HEAT MAP

(71) Applicant: International Business Machines Corporation, Armonk, NY (US)

(72) Inventors: Aviad Zlotnick, Mitzpeh Netofah (IL); Yoel Shoshan, Haifa (IL); Vadim Ratner, Haifa (IL); Daniel Khapun, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 17/374,337

(22) Filed: Jul. 13, 2021

(65) Prior Publication Data
US 2023/0017135 A1 Jan. 19, 2023

(51) Int. Cl.
*G06N 20/20* (2019.01)
*G06T 7/00* (2017.01)

(52) U.S. Cl.
CPC .......... *G06T 7/0012* (2013.01); *G06N 20/20* (2019.01); *G06T 2207/10081* (2013.01); *G06T 2207/20024* (2013.01); *G06T 2207/20076* (2013.01); *G06T 2207/30068* (2013.01)

(58) Field of Classification Search
None
See application file for complete search history.

(56) References Cited

U.S. PATENT DOCUMENTS

| 10,037,601 | B1 | 7/2018 | Ben-Ari | |
| 2019/0130562 | A1* | 5/2019 | Liu | G06V 20/64 |
| 2022/0222477 | A1* | 7/2022 | Shen | G06V 10/82 |
| 2022/0343096 | A1* | 10/2022 | Bhargava | G06F 18/214 |
| 2023/0005173 | A1* | 1/2023 | Tan | G06V 10/778 |
| 2023/0237765 | A1* | 7/2023 | Koo | G06V 10/25 |
| | | | | 382/100 |

OTHER PUBLICATIONS

Angela Casado-Garc'la, Jonathan Heras, Ensemble Methods for Object Detection, 24th European Conference on Artificial Intelligence—ECAI 2020, Santiago de Compostela, Spain, Aug. 29-Sep. 8, 2020.
(Continued)

*Primary Examiner* — Idowu O Osifade
(74) *Attorney, Agent, or Firm* — Steven M. Bouknight

(57) ABSTRACT

Embodiments may include novel techniques to improve detection of objects in images, for example, in Digital Breast Tomography and that are applicable to ensembles of detectors. For example, a method may comprise generating a plurality of candidate bounding boxes for each of a plurality of image slices of imaged tissue, each generated candidate bounding box having a probability score, collecting at least some of the generated candidate bounding boxes for each slice, generating a heat map of the filtered candidate bounding boxes and filtering the candidate bounding boxes in the heat map based on a first threshold of values in the heat map, performing Non-Maximum Suppression on the heat map filtered candidate bounding boxes, and outputting at least one bounding box based on the probability score.

15 Claims, 4 Drawing Sheets

(56) References Cited

OTHER PUBLICATIONS

Jinsu Lee, Sang-Kwang Lee, Seong-II Yang, An Ensemble Method of CNN Models for Object Detection, Oct. 17, 2018, 2018 International Conference on Information and Communication Technology Convergence (ICTC), https://ieeexplore.ieee.org/document/8539396.

Atakan Körez, Necaattin Barsçi, Aydin çetin, Uçman Ergün, Weighted Ensemble Object Detection with Optimized Coefficients for Remote Sensing Images, (Jun. 4, 2020), ISPRS Int. J. Geo-Inf. 2020, 9, 370; doi:10.3390/ijgi9060370.

Yihui He; Chenchen Zhu; Jianren Wang; Marios Savvides; Xiangyu Zhang, Bounding Box Regression With Uncertainty for Accurate Object Detection, Jun. 15, 2019, 2019 IEEE/CVF Conference on Computer Vision and Pattern Recognition (CVPR), https://ieeexplore.ieee.org/document/8953889.

Dang T., Nguyen T.T., McCall J. (Nov. 17, 2020) Toward an Ensemble of Object Detectors. In: Yang H., Pasupa K., Leung A.C.S., Kwok J.T., Chan J.H., King I. (eds) Neural Information Processing. ICONIP 2020. Communications in Computer and Information Science, vol. 1333. Springer, Cham. https://doi.org/10.1007/978-3-030-63823-8_53.

H. Zhou, Z. Li, C. Ning and J. Tang, "CAD: Scale Invariant Framework for Real-Time Object Detection," 2017 IEEE International Conference on Computer Vision Workshops (ICCVW), 2017, pp. 760-768, doi: 10.1109/ICCVW.2017.95.

J. Hosang, R. Benenson and B. Schiele, "Learning Non-maximum Suppression," 2017 IEEE Conference on Computer Vision and Pattern Recognition (CVPR), 2017, pp. 6469-6477, doi: 10.1109/CVPR.2017.685.

Navaneeth Bodla, Bharat Singh, Rama Chellappa, Larry S. Davis, Improving Object Detection With One Line of Code, arXiv:1704.04503v2 [cs.CV] Aug. 8, 2017.

William Lotter, et al., Robust breast cancer detection in mammography and digital breast tomosynthesis using annotation-efficient deep learning approach, Dec. 2019, ResearchGate, https://www.researchgate.net/publication/338138715.

Roman Solovyev, et al., Weighted Boxes Fusion: combining boxes for object detection models, arXiv:1910.13302v2 [cs.CV] Aug. 14, 2020.

Ruoyu Guo, Cheng Cui, Yuning Du, Xianglong Meng, Xiaodi Wang, Jingwei Liu, Jianfeng Zhu, Yuan Feng, Shumin Han, 2nd Place Solution in Google AI Open Images Object Detection Track 2019, arXiv:1911.07171v1 [cs.CV] Nov. 17, 2019.

Yihui He, Xiangyu Zhang, Kris Kitani, Marios Savvides, Softer-NMS: Rethinking Bounding Box Regression for Accurate Object Detection, ResearchGate, Sep. 2018, https://www.researchgate.net/publication/327858877.

* cited by examiner

PRE-NMS FILTERING USING A HEAT MAP

BACKGROUND

The present invention relates to novel techniques for improve detection of objects in images, for example, in Digital Breast Tomography. These techniques may be directly applicable to ensembles of detectors.

A typical task in object detection is choosing a single bounding box from a collection of many bounding boxes that are assumed to cover the detected object. In some cases, all these boxes are produced by a single algorithm, e.g., a Feature Pyramid Network. In other cases, these boxes may have been produced by multiple detection algorithm.

Until recently, Non-Maximum Suppression (NMS) was the algorithm of choice for choosing the one out of many bounding boxes. This algorithm has not been changed for many years. Classic NMS is a greedy algorithm. For every class of objects, the bounding box with the highest score is picked. All bounding boxes whose overlap with a chosen box is greater than a threshold are discarded, and the process is iterated with the highest score bounding box that remains. The picked bounding boxes are returned.

Recently, several modifications have been proposed. One type of modification is in the selection of the bounding box. For example, overlapping bounding boxes are not discarded but rather their scores are reduced. This avoids losing a good detection because of a small overlap with a bounding box that has a higher score. Another type of modification aims to fuse several detection boxes instead of selecting one, by weighting the detection boxes using various techniques. Still another modification involves ensemble methods for object detection, focusing on voting strategies and test time augmentation. Before applying NMS they analyze how many detectors voted for a particular region, defining three strategies: affirmative, in which at least one detector is enough for a candidate bounding be passed on to NMS, consensus, in which at least half of the detectors vote for the region is required, and unanimous, in which a bounding box is rejected unless all the detectors vote for it.

Finally, NMS may be replaced altogether by integrating the selection of bounding boxes into the detector neural network. This approach is not applicable to ensembles of detectors.

However, these approaches may have a number of problems, such as non-rejection of a high-score bounding box that was proposed by a small number of detectors and does not overlap with other bounding boxes.

Thus, a need arises for techniques to improve detection of objects in images, for example, in Digital Breast Tomography and that are applicable to ensembles of detectors.

SUMMARY

Embodiments may include novel techniques to improve detection of objects in images, for example, in Digital Breast Tomography and that are applicable to ensembles of detectors. For example, embodiments may perform Non-maximal Suppression of all boxes together, regardless of the slice. Likewise, embodiments may derive a heatmap where each element (pixel/voxel) represents the amount of boxes that share this element and their scores. Further, embodiments may filter boxes using a heat map, with a threshold proportional to the maximum value in the heat map, and a central rectangle in the box above the threshold For example, in an embodiment, a method may be implemented in a computer system comprising a processor, memory accessible by the processor, and computer program instructions stored in the memory and executable by the processor and the method may comprise generating a plurality of candidate bounding boxes for each of a plurality of image slices of imaged tissue, each generated candidate bounding box having a probability score, collecting at least some of the generated candidate bounding boxes for each slice, generating a heat map of the filtered candidate bounding boxes and filtering the candidate bounding boxes in the heat map based on a first threshold of values in the heat map, performing Non-Maximum Suppression on the heat map filtered candidate bounding boxes, and outputting at least one bounding box based on the probability score.

In embodiments, the method may further comprise filtering the collected candidate bounding boxes by size before generating the heat map. Filtering the collected candidate bounding boxes by size may comprise filtering out candidate bounding boxes that are larger than a second threshold size and reducing a probability score of each candidate bounding box that is smaller than a third threshold size. Generating the heat map may comprise generating an empty heat map and for each filtered candidate bounding box, adding to the heat map pixels that fall in that candidate bounding box using a function that monotonically increases with the probability score of that filtered candidate bounding box. The function may be 1+the probability score of that filtered candidate bounding box. Filtering the candidate bounding boxes in the heat map may comprise computing the first threshold using a function that monotonically increases with the maximum value of the heat map pixels, and for each filtered candidate bounding box, filtering out that filtered candidate bounding box when a rectangle at the center of that filtered candidate bounding box has at least one pixel that is less than the first threshold. The function may be a coefficient*sqrt(heat_map-.max( )).

In an embodiment, a system may comprise a processor, memory accessible by the processor, and computer program instructions stored in the memory and executable by the processor to perform generating a plurality of candidate bounding boxes for each of a plurality of image slices of imaged tissue, each generated candidate bounding box having a probability score, collecting at least some of the generated candidate bounding boxes for each slice, generating a heat map of the filtered candidate bounding boxes and filtering the candidate bounding boxes in the heat map based on a first threshold of values in the heat map, performing Non-Maximum Suppression on the heat map filtered candidate bounding boxes, and outputting at least one bounding box based on the probability score In an embodiment, a computer program product may comprise a non-transitory computer readable storage having program instructions embodied therewith, the program instructions executable by a computer, to cause the computer to perform a method that may comprise generating a plurality of candidate bounding boxes for each of a plurality of image slices of imaged tissue, each generated candidate bounding box having a probability score, collecting at least some of the generated candidate bounding boxes for each slice, generating a heat map of the filtered candidate bounding boxes and filtering the candidate bounding boxes in the heat map based on a first threshold of values in the heat map, performing Non-Maximum Suppression on the heat map filtered candidate bounding boxes, and outputting at least one bounding box based on the probability score

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may include novel techniques to improve detection of objects in images, for example, in Digital Breast Tomography and that are applicable to ensembles of detectors. For example, embodiments may perform Non-maximal Suppression of all boxes together, regardless of the slice. Likewise, embodiments may derive a heatmap where each element (pixel/voxel) represents the amount of boxes that share this element and their scores. Further, embodiments may filter boxes using a heat map, with a threshold proportional to the maximum value in the heat map, and a central rectangle in the box above the threshold Breast cancer (BC) is a leading cause of cancer death in women worldwide. Digital Mammography (DM), a 2D X-ray based projection of the breast, is the standard of care for breast screening. AI models trained on large-scale DM data have been largely successful at diagnosing BC. Digital Breast Tomosynthesis (DBT) imaging is a new modality that offers a higher diagnostic accuracy than DM. DBT, a three-dimensional (3D) imaging modality, acquires scans by rotating an X-ray tube around the breast. The DBT volume is reconstructed from these projection views, having between 30 to 100 slices per breast side-view. Embodiments of the present techniques may be applicable to detecting lesions in images acquired using DBT. Likewise, embodiments may be applicable to other types and/or use cases of image analysis.

Figure 1:
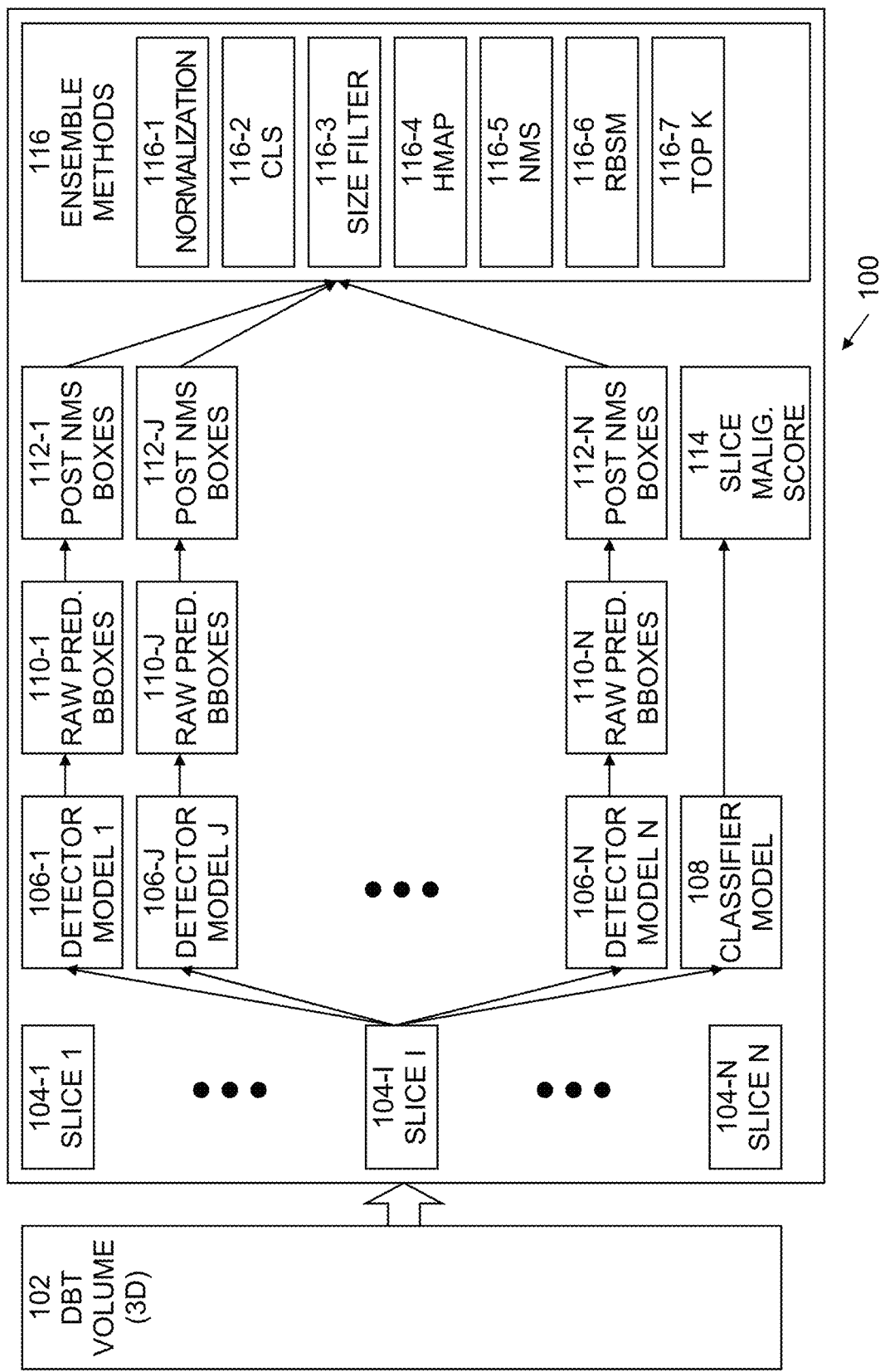
FIG. 1 is an exemplary block diagram of a processing architecture according to embodiments of the present techniques.

An exemplary block diagram of a processing architecture 100, in accordance with embodiments of the present techniques, is shown in FIG. 1. Architecture 100 may include an image dataset 102, such as a Digital Breast Tomosynthesis (DBT) volume, image slices 104-1 to 104-N, detector models 106-1 to 106-N, classifier model 108, raw prediction bounding boxes 110-1 to 110-N, post Non-Maximum Suppression (NMS) boxes 112-1 to 112-N, slice malignancy score 114, and ensemble methods 116. Image dataset 102 may include a collection of a large number of images of subjects in which the desired features may be detected. For example, a DBT volume may include DBT studies with breast cancers, biopsy-proven benign lesions, actionable (requiring follow-up) non-biopsied findings, as well as normal studies (scans without any findings). A DBT volume may contains both masses and architectural distortions (changes to the tissue that indicate potential malignancy). Typically, training and testing datasets may be defined. Ground truth information may be provided only for the training dataset. Image dataset 102 may thus include a large number of images that represent slices 104-1 to 104-N of the object being imaged.

Ensemble methods 116 may include normalization method 116-1, classifier based weighting (CLS) method 116-2, size filtering method 116-3, Heat map based filtering (HMap) method 116-4, Non-Maximum Suppression (NMS) method 116-5, rank based score modification (RBSM) method 116-6, and top-K selection method 116-7. Normalization method 116-1 to perform normalization of suggested candidate bounding boxes, as described below. Classifier based weighting (CLS) method 116-2 to perform slice classifier weighting (CLS), as described below. Size filtering method 116-3 to perform filtering out of improbable candidate bounding boxes by, for example, size, as described below. Heat map based filtering (HMap) method 116-4 to perform generation of a heatmap and threshold based filtering of predictions of multiple detector models, as described below. Non-Maximum Suppression (NMS) method 116-5 to perform Non-Maximum Suppression processing of one or more types, as described below. Rank based score modification (RB SM) method 116-6 to perform rank based score modification (RBSM), as described below. Top-K selection method 116-7 to perform bounding boxes to be chosen for evaluation, as described below.

Figure 2:
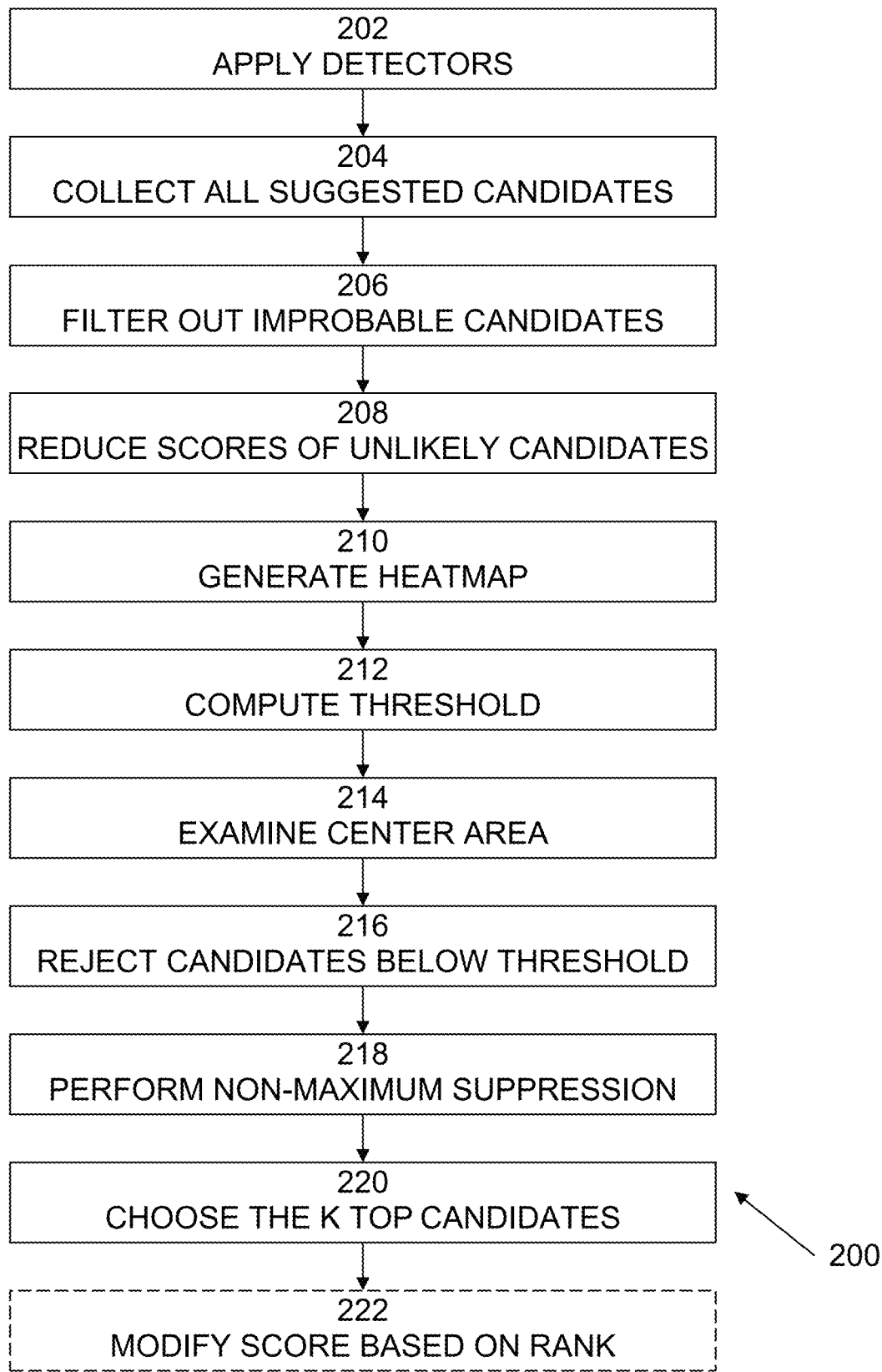
FIG. 2 is an exemplary flow diagram of an image analysis process, according to embodiments of the present techniques.

An exemplary flow diagram of an image analysis process according to the present techniques is shown in FIG. 2. It is best viewed in conjunction with FIG. 1. Process 200 may begin with 202, in which image slices 104-1 to 104-N may be obtained from image dataset 102, and supplied to feature detector models 106-1 to 106-N. For example, the input to each detector model may be a single image slice. Detector models 106-1 to 106-N may output candidate bounding boxes 110-1 to 110-N at different positions, sizes and aspect ratios in that slice, with corresponding malignancy probability scores. As findings in DBT slices usually look sharp in a small set of adjacent slices, and very blurry in others, a 2D detector may perform well as a candidate bounding box generator. For training finding-level annotations may be used, including slice number and the bounding box of the finding contour. Detector models weights may be pretrained first on large numbers of categorized images, then on 2D Digital Mammography images, and only then on DBT slices. Apart from the initialization weights, different models may vary in the following aspects: Trained only on an in-house dataset or additionally fine-tuned on half of a DBT training set; Rotation augmentation—either any angle or none; Training only on images with biopsied findings or on all; and different CNN backbones. Additionally, standard image augmentations may be used for all models—namely horizontal and vertical ips, and color augmentation—gamma and contrast modifications.

At 204, all suggested candidate bounding boxes may be collected into a single collection, regardless of the source slice. For example, for a single volume (3D image) the top 3 prediction boxes from each slice may be collected, from all detector models. All the boxes may be processed without regard to the origin slice. Prediction scores for all suggested candidate bounding boxes may be normalized 116-1 linearly per model so that the lowest bounding box score per model, over all the train data, was, for example, 0, and the highest bounding box score per model was, for example, 1. Further, classifier model 108 may perform slice classifier weighting (CLS) 116-2. Classifier model 108 may compute a score per slice, and may be trained without full localization information. The bounding box scores originating from each slice may be modified by the score predicted on the same slice by the slice-classifier. For example, the modification may include multiplying each bounding box score by (1.33+slice score).

At 206, improbable candidate bounding boxes may be filtered out 116-3, for example, according to size. Filtering by size may include discarding bounding boxes whose diagonal was over a threshold size, such as 800 pixels, and halved the scores of bounding boxes with a diagonal smaller than a threshold size, such as 100 pixels. At 208, the scores of unlikely candidate bounding boxes may be reduced.

Figure 3:
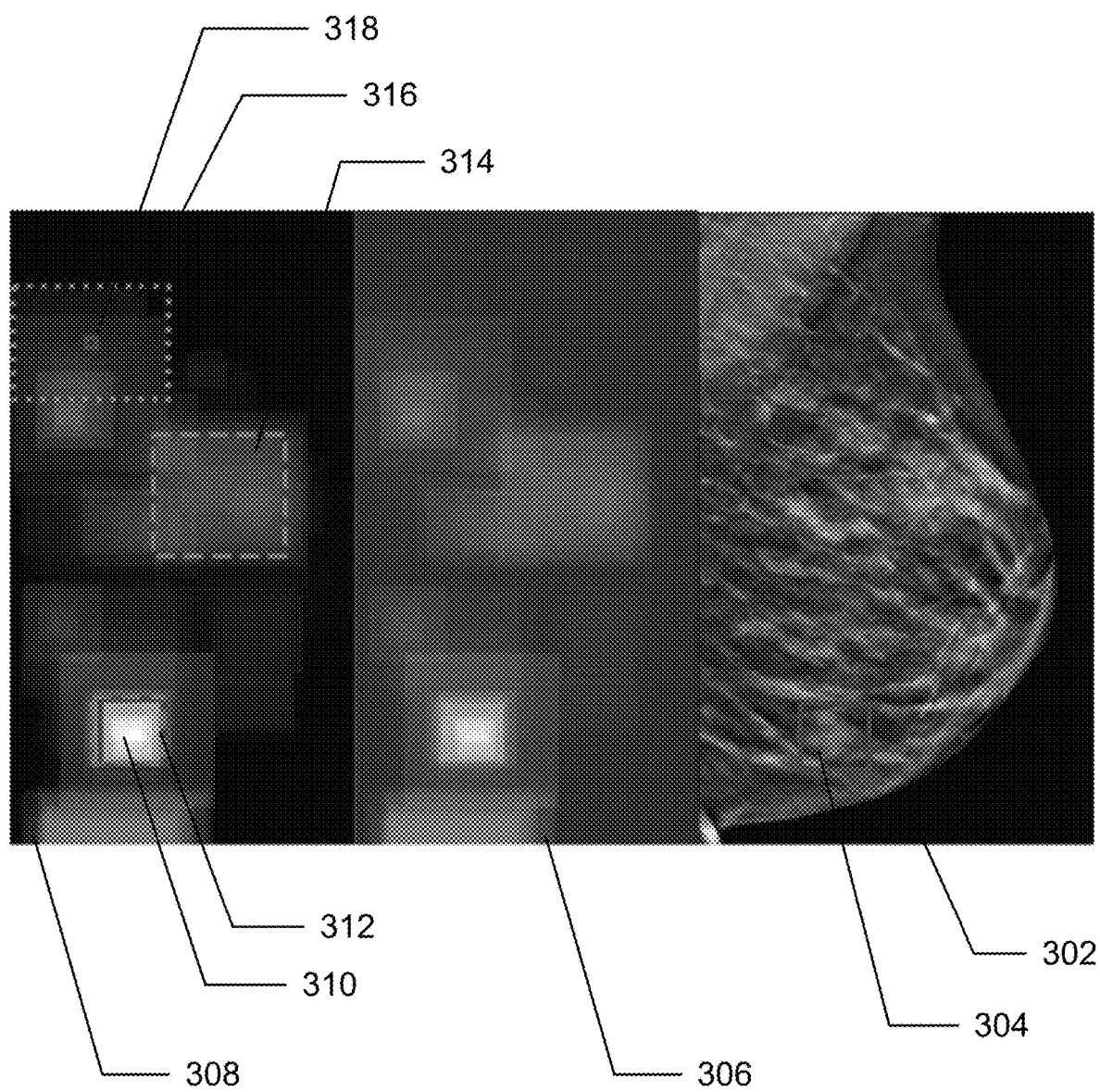
FIG. 3 is an exemplary illustration of a heat map based filter, according to embodiments of the present techniques.

At 210, a heatmap may be generated 116-4, factoring in the scores and the number of bounding boxes covering every pixel. Such a heatmap may represent predictions of multiple detector models 106-1 to 106-N, as shown in FIG. 3. FIG. 3 illustrates an example of a heat map based filter. As shown in FIG. 3, on the right is shown a DBT slice 302 with a to-be biopsied area 304. In the middle, a generated heat map 306 is shown. On the left 308 is shown a ground truth to-be biopsied location 310. Also shown are two examples 312, 314 of prediction boxes that passed the heat map based filter, and an example 316 of a box that failed the heat map based filter and was therefore rejected, including a tested central area 318. Each pixel in the generated heat map is the sum of the number of bounding boxes that cover that pixel added to the sum of scores of these bounding boxes. For example, an empty heatmap may be generated, then for each candidate bounding box, pixels that fall in that box may be added to the heat map using a function that is monotonically increasing with the box score, such as 1+the box score or 1+1.25*the box score, etc. At 212, a threshold may be computed that is related to the maximal value in the heatmap. For example, the threshold may be proportional to the maximal value in the heat map, such as a coefficient*sqrt (max(heatmap)). For example, the coefficient may be 1.7.

At 214, the central area of every candidate bounding box may be examined. For example, the examined rectangle size may be 35×35. Then, at 216, any candidate bounding box in which a rectangle in the center had at least one pixel with a value less than the threshold may be rejected.

At 218, Non-Maximum Suppression processing may be performed 116-5. For example, such processing may be performed using techniques such as standard NMS, soft-NMS, Non-Maximum Weighted (NMW), Weighted Boxes Fusion (WBF), etc. Standard Non-Maximum Suppression (NMS) removes low-scoring bounding boxes that overlap with others. In Soft-NMS, overlapping bounding boxes are not discarded but rather their scores are reduced. This avoids losing a good detection because of a small overlap with a bounding box that has a higher score. Similarly, the k top bounding boxes may be kept instead of only one. Non-Maximal Weighted (NMW) processing fuses the coordinates of overlapping boxes instead of just selecting the top score box. It uses a weighted average of the selected box with its overlapping boxes, where the weight is the product of the box score and its overlap with the selected box. Weighted Box Fusion (WBF) fuses both coordinates and scores of overlapping boxes using a weighted average, where the weight is the box score (ignoring the overlap). After averaging, the score is adjusted by multiplying by the number of overlapping boxes divided by the number of participating models.

At 220, the top k (for example, 6) bounding boxes may be chosen for evaluation 116-7 based on their scores. Further, 3D prediction boxes generation: The bounding box Z axis was adjusted to best fit the competition metrics for this axis. At 222, optionally, the scores of each box may be modified based on their rank 116-6. For example, the rank based score modification (RBSM) may be performed according to score *=0.69**(rank-2) for rank>=2.

In embodiments, all boxes from all detectors on all slices may be aggregated, and not only the top 3. In embodiments, standard NMS may be modified as follows: (1) For "surviving" bounding boxes, the slice that they originate from may be kept, to be able to later user it in the final 3D bounding box prediction. (2) Unlike the standard IoU (Intersection over union), overlap may be measured by intersection over the larger of the overlapping areas. For example, 0.05 may be used as a threshold for rejecting overlapping boxes. (3) Additionally, RBSM may not be used.

Figure 4:
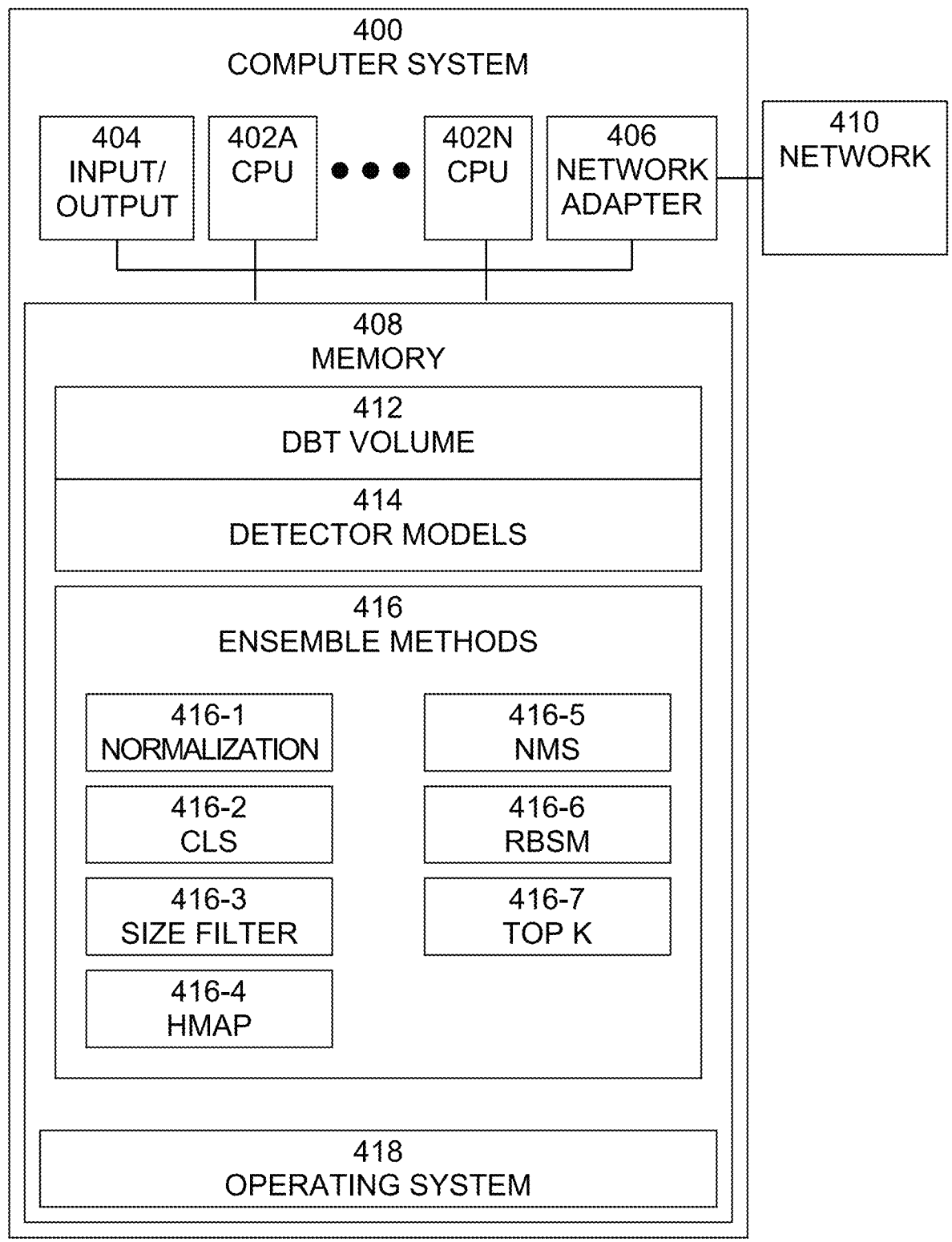
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include DBT volume 412, detector models 414, ensemble methods 416, and operating system 418. DBT volume 412 may include one or more image datasets, such as Digital Breast Tomosynthesis (DBT) volumes, include a plurality of image slices, as described above. Detector models 414 may include software routines to detect candidate bounding boxes in image slices, as described above. Ensemble methods 416 may include software routines and data to perform a sequence of processing steps, as described above. Ensemble methods 416 may include normalization method 416-1, classifier based weighting (CLS) method 416-2, size filtering method 416-3, Heat map based filtering (HMap) method 416-4, Non-Maximum Suppression (NMS) method 416-5, rank based score modification (RBSM) method 416-6, and top-K selection method 416-7. Normalization method 416-1 may include software routines and data to perform normalization of suggested candidate bounding boxes, as described above. Classifier based weighting (CLS) method 416-2 may include software routines and data to perform slice classifier weighting (CLS), as described above. Size filtering method 416-3 may include software routines and data to perform filtering out of improbable candidate bounding boxes by, for example, size, as described above. Heat map based filtering (HMap) method 416-4 may include software routines and data to perform generation of a heatmap and threshold based filtering of predictions of multiple detector models, as described above. Non-Maximum Suppression (NMS) method 416-5 may include software routines and data to perform Non-Maximum Suppression processing of one or more types, as described above. Rank based score modification (RBSM) method 416-6 may include software routines and data to perform rank based score modification (RBSM), as described above. Top-K selection method 416-7 may include software routines and data to perform bounding boxes to be chosen for evaluation, as described above. Operating system 424 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
    generating a plurality of candidate bounding boxes for each of a plurality of image slices of imaged tissue, each generated candidate bounding box having a probability score;
    collecting at least some of the generated candidate bounding boxes for each slice;
    filtering the collected candidate bounding boxes by size, wherein filtering the collected candidate bounding boxes by size comprises filtering out candidate bounding boxes that are larger than a second threshold size and reducing a probability score of each candidate bounding box that is smaller than a third threshold size;
    generating a heat map of the candidate bounding boxes and filtering the candidate bounding boxes in the heat map based on a first threshold of values in the heat map;
    performing Non-Maximum Suppression on the heat map filtered candidate bounding boxes; and
    outputting at least one bounding box based on the probability score.

2. The method of claim 1, generating the heat map comprises:
    generating an empty heat map; and
    for each filtered candidate bounding box, adding to the heat map pixels that fall in that candidate bounding box using a function that monotonically increases with the probability score of that filtered candidate bounding box.

3. The method of claim 2, wherein the function is 1+the probability score of that filtered candidate bounding box.

4. The method of claim 2, wherein filtering the candidate bounding boxes in the heat map comprises:
    computing the first threshold using a function that monotonically increases with the maximum value of the heat map pixels; and
    for each filtered candidate bounding box, filtering out that filtered candidate bounding box when a rectangle at the center of that filtered candidate bounding box has at least one pixel that is less than the first threshold.

5. The method of claim 4, wherein the function is a coefficient*sqrt(heat_map.max( )).

6. A system comprising a processor, memory accessible by the processor, and computer program instructions stored in the memory and executable by the processor to perform:
    generating a plurality of candidate bounding boxes for each of a plurality of image slices of imaged tissue, each generated candidate bounding box having a probability score;
    collecting at least some of the generated candidate bounding boxes for each slice;
    filtering the collected candidate bounding boxes by size, wherein filtering the collected candidate bounding boxes by size comprises filtering out candidate bounding boxes that are larger than a second threshold size and reducing a probability score of each candidate bounding box that is smaller than a third threshold size;

generating a heat map of the candidate bounding boxes and filtering the candidate bounding boxes in the heat map based on a first threshold of values in the heat map;

performing Non-Maximum Suppression on the heat map filtered candidate bounding boxes; and outputting at least one bounding box based on the probability score.

7. The system of claim 6, generating the heat map comprises:

generating an empty heat map; and for each filtered candidate bounding box, adding to the heat map pixels that fall in that candidate bounding box using a function that monotonically increases with the probability score of that filtered candidate bounding box.

8. The system of claim 7, wherein the function is 1+the probability score of that filtered candidate bounding box.

9. The system of claim 7, wherein filtering the candidate bounding boxes in the heat map comprises:

computing the first threshold using a function that monotonically increases with the maximum value of the heat map pixels; and for each filtered candidate bounding box, filtering out that filtered candidate bounding box when a rectangle at the center of that filtered candidate bounding box has at least one pixel that is less than the first threshold.

10. The system of claim 9, wherein the function is a coefficient*sqrt(heat_map.max( )).

11. A computer program product comprising a non-transitory computer readable storage having program instructions embodied therewith, the program instructions executable by a computer, to cause the computer to perform a method comprising:

generating a plurality of candidate bounding boxes for each of a plurality of image slices of imaged tissue, each generated candidate bounding box having a probability score;

collecting at least some of the generated candidate bounding boxes for each slice;

filtering the collected candidate bounding boxes by size, wherein filtering the collected candidate bounding boxes by size comprises filtering out candidate bounding boxes that are larger than a second threshold size and reducing a probability score of each candidate bounding box that is smaller than a third threshold size;

generating a heat map of the candidate bounding boxes and filtering the candidate bounding boxes in the heat map based on a first threshold of values in the heat map;

performing Non-Maximum Suppression on the heat map filtered candidate bounding boxes; and outputting at least one bounding box based on the probability score.

12. The computer program product of claim 11, generating the heat map comprises:

generating an empty heat map; and for each filtered candidate bounding box, adding to the heat map pixels that fall in that candidate bounding box using a function that monotonically increases with the probability score of that filtered candidate bounding box.

13. The computer program product of claim 12, wherein the function is 1+the probability score of that filtered candidate bounding box.

14. The computer program product of claim 12, wherein filtering the candidate bounding boxes in the heat map comprises:

computing the first threshold using a function that monotonically increases with the maximum value of the heat map pixels; and for each filtered candidate bounding box, filtering out that filtered candidate bounding box when a rectangle at the center of that filtered candidate bounding box has at least one pixel that is less than the first threshold.

15. The computer program product of claim 14, wherein the function is a coefficient*sqrt(heat_map.max( )).

* * * * *